US012794692B2

(12) United States Patent
Tambekar et al.

(10) Patent No.: US 12,794,692 B2
(45) Date of Patent: Nov. 10, 2026

(54) APPLIANCE SECURITY WITH TOKEN AUTHENTICATION IN CLUSTERED ECOSYSTEMS

(71) Applicant: Dell Products L.P., Round Rock, TX (US)

(72) Inventors: Piyush Ravikant Tambekar, Pune (IN); Abhidnya Sushant Joshi, Pune (IN); Karimuthu Rengasamy, Lafayette, CO (US); Arun Kumar, Bangalore (IN); Nayan Pradeep Kulkarni, Pune (IN)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 18/974,529

(22) Filed: Dec. 9, 2024

(65) Prior Publication Data

US 2026/0163730 A1 Jun. 11, 2026

(51) Int. Cl.
*H04L 29/06* (2006.01)
*H04L 9/14* (2006.01)

(52) U.S. Cl.
CPC .................................... *H04L 9/14* (2013.01)

(58) Field of Classification Search
None
See application file for complete search history.

(56) References Cited

U.S. PATENT DOCUMENTS

| | | | | |
|---|---|---|---|---|
| 12,235,984 B1 * | 2/2025 | Ramesh | .............. | G06F 21/6218 |
| 12,381,868 B2 * | 8/2025 | Abraham | ............ | H04L 63/0861 |
| 2007/0061266 A1 * | 3/2007 | Moore | .................. | G06Q 50/00 705/51 |
| 2013/0104251 A1 * | 4/2013 | Moore | ................. | G06F 21/602 726/30 |

(Continued)

OTHER PUBLICATIONS

Sridhar, S.; Smys, S. A hybrid multilevel authentication scheme for private cloud environment. 2016 10th International Conference on Intelligent Systems and Control (ISCO). https://ieeexplore.ieee.org/stamp/stamp.jsp?tp=&arnumber=7727141 (Year: 2016).*

(Continued)

*Primary Examiner* — Jeremiah L Avery
(74) *Attorney, Agent, or Firm* — Chamberlain, Hrdlicka, White, Williams & Aughtry; Aly Z. Dossa

(57) ABSTRACT

A method for authenticating interactions between a backup agent and a backup server includes receiving, by the backup agent, an authentication token from the backup server, wherein the authentication token is encrypted with a public key of an intended backup agent and signed with an intent. In addition, the method includes decrypting the authentication token, using a private key of the backup agent, and making a first determination, based on the decrypting, that the backup agent is the intended backup agent. Moreover, the method includes retrieving, based on the first determination, public keys related to the authentication token from an identity access management (IAM) service. Further, the method includes validating the authentication token using (Continued)

the public keys related to the authentication token and performing, in response to the validation and based on the intent, an action from an action set.

20 Claims, 4 Drawing Sheets

(56) References Cited

U.S. PATENT DOCUMENTS

| | | | | |
|---|---|---|---|---|
| 2013/0179947 | A1* | 7/2013 | Kline, III | H04L 63/0892<br>726/4 |
| 2014/0164776 | A1* | 6/2014 | Hook | G06F 21/6218<br>713/171 |
| 2015/0222604 | A1* | 8/2015 | Ylonen | G06F 21/575<br>713/171 |
| 2016/0277374 | A1* | 9/2016 | Reid | H04L 63/0435 |
| 2016/0337124 | A1* | 11/2016 | Rozman | G06F 21/6209 |
| 2016/0352518 | A1* | 12/2016 | Ford | G06F 11/1448 |
| 2017/0093811 | A1* | 3/2017 | Dolev | H04L 45/1287 |
| 2019/0007204 | A1* | 1/2019 | Field | H04L 9/0894 |
| 2019/0386969 | A1* | 12/2019 | Verzun | G06F 21/606 |
| 2020/0228343 | A1* | 7/2020 | Yu | G06F 11/1464 |
| 2022/0141192 | A1* | 5/2022 | Silveira | G06F 21/606<br>726/15 |
| 2022/0247678 | A1* | 8/2022 | Atwal | H04L 45/645 |
| 2024/0137231 | A1* | 4/2024 | Zhu | H04L 9/50 |
| 2024/0187234 | A1* | 6/2024 | Krishnan | H04L 9/50 |
| 2024/0333605 | A1* | 10/2024 | Hay-Saikevich | G06F 9/45558 |
| 2026/0163730 | A1* | 6/2026 | Tambekar | H04L 9/14 |

OTHER PUBLICATIONS

Pitchay, Sakinah Ali et al. A Proposed System Concept on Enhancing the Encryption and Decryption Method for Cloud Computing. 2015 17th UKSim-AMSS International Conference on Modelling and Simulation (UKSim). https://ieeexplore.ieee.org/stamp/ stamp.jsp?tp=&arnumber=7576545 (Year: 2015).*

Susmitha, Chivukula et al. Hybrid Cryptography for Secure File Storage. 2023 7th International Conference on Computing Methodologies and Communication (ICCMC). https://ieeexplore.ieee.org/stamp/stamp.jsp?tp=&arnumber=10084073 (Year: 2023).*

* cited by examiner

APPLIANCE SECURITY WITH TOKEN AUTHENTICATION IN CLUSTERED ECOSYSTEMS

BACKGROUND

Backing up data is important to ensure the security and availability of data in data systems. This process is often performed using backup servers. In many cases, backup servers rely on backup agents to facilitate and manage the process. Verifying the authenticity of the backup agents is essential to prevent unauthorized manipulation and access to data.

DETAILED DESCRIPTION

Figure 1:
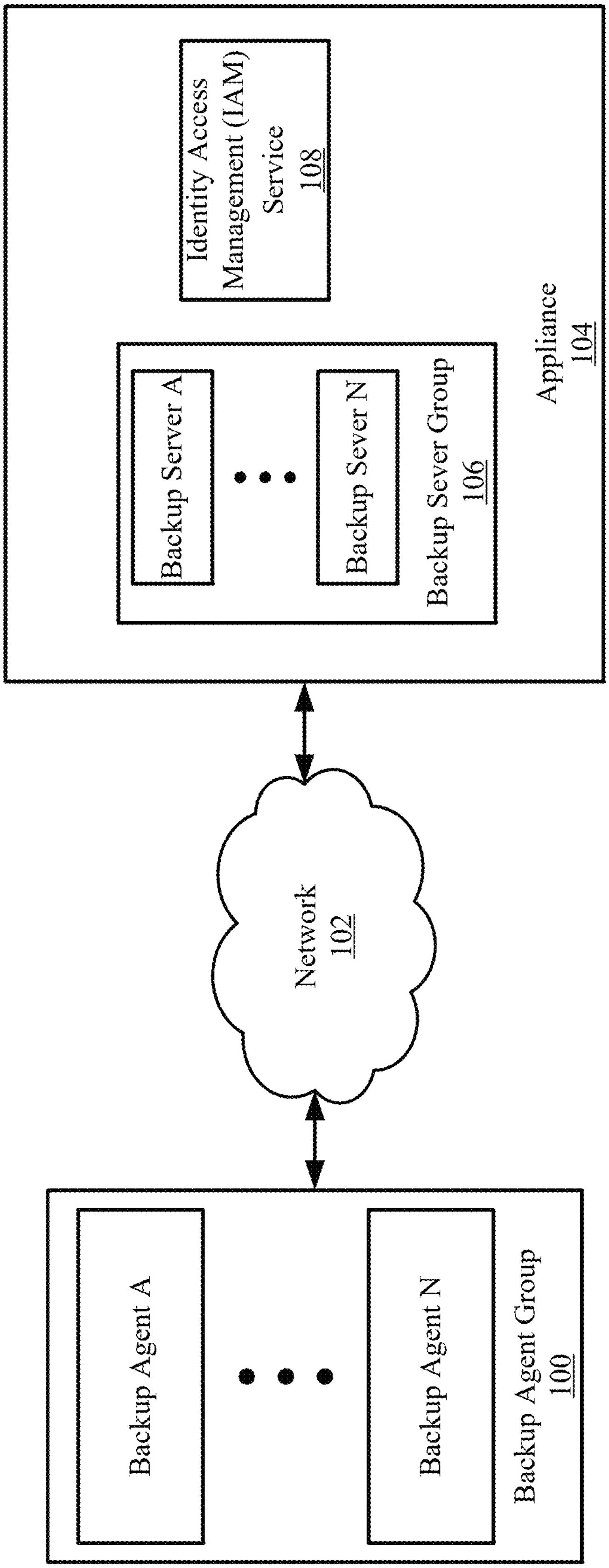
FIG. 1 shows a system in accordance with one or more embodiments.

Backing up data is essential to running a secure and effective computing system. Backup ecosystems are often used to store data in computing systems and generally include backup agents and backup servers that enable efficient data protection and recovery. Backup agents are software applications within a network that manage data extraction and transfer for backup and recovery purposes. Backup servers are used to coordinate backup workflow and manage data storage on storage media (disk arrays, cloud storage, etc.). When a backup job is initiated the backup agent transfers data to the backup server which organizes it according to retention and redundancy policies. In a typical backup ecosystem, there are often thousands of backup agents transferring and restoring data for the backup server. In these ecosystems, the backup server instructs the backup agents on specific policies such as backup schedules, backup locations, maintenance windows, etc. The backup server that sends these communications often acts as a "client" and the backup agent receiving the communications acts as a "server" temporarily.

Typically, in client-server ecosystems, the backup agent uses transport layer security (TLS) protocol to establish a trusted connection with the backup server. The backup agent does this by retrieving a certificate from the backup server and validating it by determining whether it has been signed by a known trusted certificate authority (CA). After establishing the trusted connection, the backup server verifies the identity of the backup agent. In a single-node system, ingress and egress between the backup agent and the backup server occur over the same set of internet protocol (IP) addresses (i.e., unique numerical strings that identify a device or network connected to the internet) making it easy for the backup server to validate and establish the identity of the backup agent. But, in a clustered (multi-node) appliance, establishing the identity of the backup agent is difficult due to ingress and egress occurring over different sets of IPs. Thus, the single-node solution is not applicable to clustered (multi-node) appliances, as the request from the backup server can originate from any of the cluster's IP addresses.

Thus, there is a need for a verification method that works both in a single node and a multi-node ecosystem. This disclosure introduces a solution in which a backup server residing in a clustered (multi-node) appliance, instructs a backup agent, residing outside of the clustered (multi-node) appliance, to trigger a backup policy. To establish authenticity between the backup server and the backup agent, the backup server generates an authentication token with an intent for the backup agent (e.g., restore data from storage, backup data to storage, perform maintenance, etc.) and then encrypts the authentication token using an intended backup agent's public key (i.e., a cryptographic code used to encrypt data, unique to the intended backup agent and only decryptable by the intended backup agent's private key). The backup server then sends the authentication token to the backup agent. After receiving the encrypted authentication token, the backup agent attempts to decrypt it using its private key (i.e., a confidential cryptographic code used to decrypt data, known only by the backup agent). If the backup agent is successful in decrypting the encrypted authentication token, then it can be assumed that the intended backup agent has received the authentication token. The backup agent then proceeds with the intent specified in the token.

Specific embodiments will now be described with reference to the accompanying figures.

FIG. 1 shows a system in accordance with one or more embodiments. The system may include a backup agent group (100), a network (102), an appliance (104), a backup server group (106), and an identity access management (IAM) service (108). The system may include additional, fewer, and/or different components without departing from the scope of the embodiments disclosed herein. Each component may be operably/operatively connected to any of the other components via any combination of wired and/or wireless connections. Each of these system components is described below.

In one or more embodiments, the backup agent group (100) includes backup agents A-N, with each backup agent including the functionality to perform actions for the backup server group (106). In one or more embodiments, the actions include performing backup operations on a computing device (e.g., data transfer, compression, etc.), performing restoration operations on data from the backup server group (106) (i.e., full system recovery, file/folder recovery, metadata recovery, etc.), performing maintenance operations on data from the backup server group (106) (e.g., deduplication, throttling, etc.), and performing security operations on data from the backup server group (106) (e.g., encryption, validation, tracking, authentication, etc.). In one or more embodiments, the backup agents A-N include the functionality to generate backup containers (not shown) to perform the actions. Each backup container may be a virtualization of resources that includes functionality for obtaining data and servicing the corresponding actions.

In one or more embodiments, the backup agents A-N of the backup agent group (100) are implemented as any combination of computing devices (see e.g., FIG. 4) and logical devices. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the backup agents A-N of the backup agent group (100) described throughout this application. The logical device may utilize the computing resources of any number of computing devices and thereby provide the functionality of the backup agents A-N of the backup agent group (100).

Figure 2:
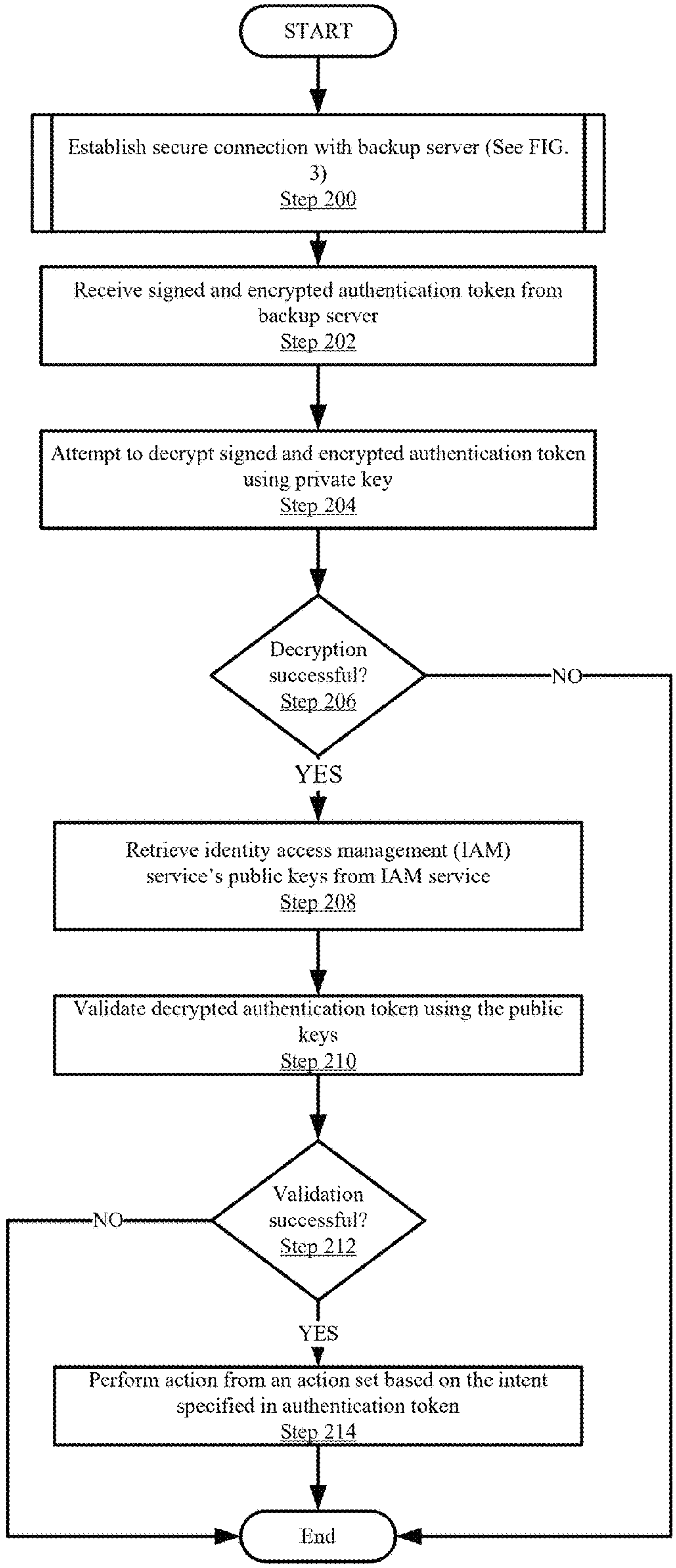
FIG. 2 shows a flowchart of a method for authenticating interactions between a backup agent and a backup server in accordance with one or more embodiments.
Figure 3:
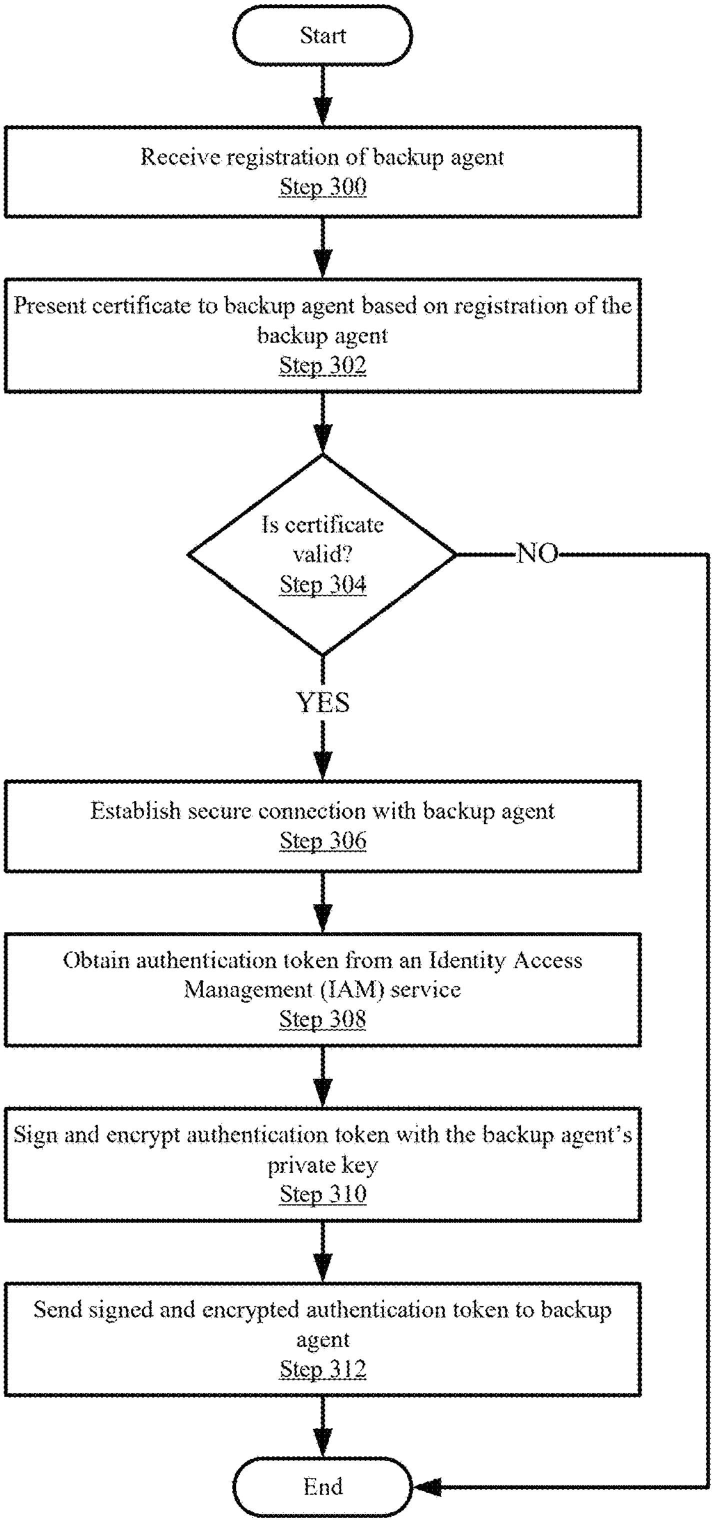
FIG. 3 shows a flowchart of a method for generating an encrypted authentication token in accordance with one or more embodiments.

Further, the backup agent group (100) may include functionality to perform at least a portion of the methods shown in FIGS. 2-3. One of ordinary skill in the art will appreciate that the backup agent group (100) may perform other functionalities without departing from the scope of the embodiment disclosed herein.

In one or more embodiments, the backup agent group (100), the appliance (104), the backup server group (106), and the IAM service (108) may be operatively connected to one another through the network (102) (e.g., a local area network (LAN), a wide area network (WAN) such as the Internet, a mobile network, any other network type, or a combination thereof). The network (102) may be implemented using any combination of wired and/or wireless connections. Further, the network (102) may encompass various interconnected, network-enabled subcomponents (or systems) (e.g., switches, routers, gateways, etc.) that may facilitate communications between the backup agent group (100), the appliance (104), the backup server group (106), and the IAM service (108). Moreover, the backup agent group (100), the appliance (104), the backup server group (106), and the IAM service (108) may communicate with one another using any combination of wired and/or wireless communication protocols.

In one or more embodiments, the appliance (104) is a computing device that includes the functionality to perform specialized computing tasks, integrating hardware and software as a unified system. In one or more embodiments, the appliance (104) may include the functionality to host and manage the backup server group (106) and the IAM service (108) to perform specific tasks such as data management, security optimization, and network optimization. In one or more embodiments, the appliance (104) may be a clustered integrated appliance including multiple interconnected nodes and devices configured to share workloads. In one or more embodiments, the appliance (104) may include one or more processors, non-persistent storage (e.g., volatile memory, such as random access memory (RAM), cache memory), persistent storage (e.g., a hard disk, an optical drive such as a compact disk (CD) drive or digital versatile disk (DVD) drive, flash memory, etc.), one or more communication modules (e.g., Bluetooth module, infrared module, network module (which may be wired or wireless), a wireless module (e.g., a module that a support wireless protocols such as, but not limited to, IEEE 802.11), cellular module (e.g., a module that supports one or more cellular data communication protocols), Data Over Cable Service Interface Specification (DOCSIS) module (which may be implemented as a cable modem or in combination with a cable modem), optical module, near-field communication (NFC) module, long range (LoRa) wireless communication module, etc.), and numerous other elements and functionalities (e.g., a random number generator, a trusted platform module (TPM), etc.). In one or more embodiments, the appliance (104) is implemented as a logical device. The logical device may utilize the computing resources of any number of computing devices (see e.g., FIG. 4) and thereby provide the functionality of the appliance (104). Further, the appliance (104) may include functionality to perform at least a portion of the methods shown in FIGS. 2-3. One of ordinary skill in the art will appreciate that the appliance (104) may perform other functionalities without departing from the scope of the embodiment disclosed herein.

In one or more embodiments, the backup server group (106) includes functionality to coordinate backup workflow and manage data storage on storage media (disk arrays, cloud storage, etc.). In one or more embodiments, the backup server group (106) may include backup servers A-N. In one or more embodiments, the backup server group (106) includes the functionality to perform backup tasks including but not limited to, scheduling backups actions, and verifying data integrity, verifying backup agent identity as described in FIGS. 2-3, managing data, detecting anomalies within data, etc. In one or more embodiments, the backup server group (106) is a collection of interconnected servers (i.e., backup servers A-N) configured to provide redundancy and data protection through coordinated backup and recovery operations. In one or more embodiments, the backup server group (106) may include specialized backup servers for data ingestion, compression, encryption, and storage. In one or more embodiments, the backup servers A-N may be operably connected through a network (102) to enable efficient data transfer and synchronization across the backup server group (106). In one or more embodiments, the backup server group (106) may reside on the appliance (104). In one or more embodiments, the backup servers A-N, include the functionality to prompt backup agents A-N to perform actions (backup operations, restoration operations, maintenance operations, security operations, etc.) for the backup server group (106). In one or more embodiments, the backup servers A-N verify the identity of the backup agents A-N before allowing them to perform the actions to prevent unauthorized access to the data of the backup server group (106).

In one or more embodiments, the backup server group (106) stores the data in storage devices (not shown) of the system. Each storage device includes functionality for storing application data, file data (e.g., data associated with a file system), and/or any other data without departing from what is disclosed herein. The data stored in the storage devices may be accessible via the backup server group (106). The storage devices may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments, the storage devices may be operably connected to the backup server group (106).

Figure 4:
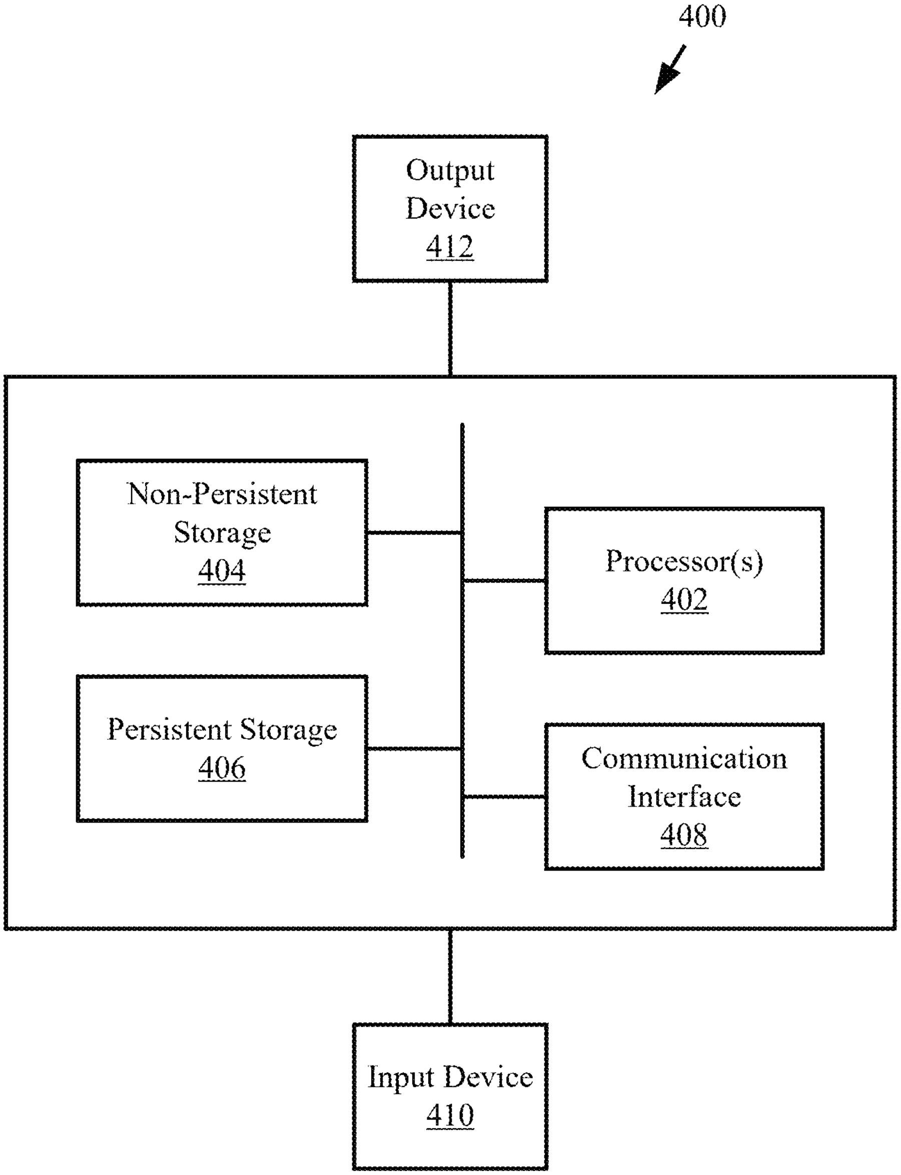
FIG. 4 shows a diagram of a computing device in accordance with one or more embodiments.

In one or more embodiments, the backup server group (106) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the backup server group (106) described throughout this application.

In one or more embodiments, the backup server group (106) is implemented as a logical device. The logical device may utilize the computing resources of any number of computing devices and thereby provide the functionality of the backup server group (106).

Further, the backup server group (106) may include functionality to perform at least a portion of the methods shown in FIGS. 2-3. One of ordinary skill in the art will appreciate that the backup server group (106) may perform other functionalities without departing from the scope of the embodiment disclosed herein.

In one or more embodiments, the IAM service (108) includes the functionality to manage the authentication and authorization of users, devices, and services within a network (102). In one or more embodiments, the IAM service (108) is a trusted authority that issues authentication tokens (e.g., OAuth tokens) that grant access to data and permission to perform operations (e.g., backup operations, recovery operations, etc.). In one or more embodiments, these authentication tokens may be signed by the IAM service (108) to ensure authenticity (i.e., signed with the IAM service's (108) private key). In one or more embodiments, the IAM service includes the functionality to provide public keys, enabling verification that the authentication tokens were issued by the IAM service (108), as described below in FIG. 2.

In one or more embodiments, the IAM service (108) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the IAM service (108) described throughout this application.

In one or more embodiments, the IAM service (108) is implemented as a logical device. The logical device may utilize the computing resources of any number of computing devices and thereby provide the functionality of IAM service (108)

Further, the IAM service (108) may include functionality to perform at least a portion of the methods shown in FIGS. 2-3. One of ordinary skill in the art will appreciate that the IAM service (108) may perform other functionalities without departing from the scope of the embodiment disclosed herein.

As described above, when operating in a clustered integrated appliance, verifying the identity of the backup server is difficult because ingress and egress happens over a different set of IPs. The method described in FIG. 2 below, seeks to resolve this issue using an authentication process that includes the use of an encrypted authentication token. The use of the method enables the backup agent to verify the identity of the backup server to enhance the security of the actions taken by the backup agent.

Turning to FIG. 2, FIG. 2 shows a flowchart of a method for authenticating interactions between a backup agent and a backup server in accordance with one or more embodiments disclosed herein. The method may be performed by, for example, a backup agent (e.g., one backup agent of backup agents A to N of backup agent group (e.g., 100 in FIG. 1)). Other components in the system may perform this method without departing from the scope of the disclosure.

In step 200, the backup agent establishes secure a connection with a backup server (e.g., one backup server of backup servers A-N of backup server group (e.g., 106 in FIG. 1)) as discussed in further detail in FIG. 3. In one or more embodiments, the secure connection is established over an egress IP address of the backup server used by the backup server when sending data out of its network. In one or more embodiments, the appliance (e.g., 104 in FIG. 1) is assigned a number of different egress IP addresses and may, in turn, assign the same backup server to different egress IP addresses at different times. As such, the IP address of the backup server is not usable to reliably identify the backup server. It should be appreciated, that the backup agent may establish a secure connection with the backup server by any means known in the art or discovered in the future.

In step 202, the backup agent receives a signed and encrypted authentication token from the backup server. In one or more embodiments, the authentication token is encrypted with an intended backup agent's public key. In one or more embodiments, a public key is a cryptographic code used to encrypt data, unique to an entity (e.g., the intended backup agent). In one or more embodiments, data encrypted by the public key can only be decrypted using a private key (i.e., a confidential cryptographic code used to decrypt data, unique to and known only by an entity (e.g., the intended backup agent)) associated with the public key (e.g., the intended backup agent's private key). It should be appreciated, that once the authentication token has been encrypted with the intended backup agent's public key, it can only be decrypted using the intended backup agent's private key. It should be further appreciated, that the intended backup agent's private key is exclusive to the intended backup agent. Thus, only the intended backup agent will be able to utilize the authentication token. It should be appreciated, that this method will work both in single appliance systems over one IP address and clustered appliance (e.g., 104 in FIG. 1) systems over many IP addresses because the encryption avoids the use of IP addresses. It should be appreciated, that this will prevent unauthorized backup agents from utilizing the authentication token to perform unauthorized actions within the system (e.g., stealing data, deleting data, etc.). In one or more embodiments, the authentication token may be signed with or otherwise include an intent. In one or more embodiments, the intent is related to an action or a set of actions for the backup agent to perform as described above In one or more embodiments, the authentication token is created by an identity access management (IAM) service (e.g., 108 in FIG. 1). In one or more embodiments, the authentication token has been signed by the IAM service (e.g., 108 in FIG. 1) with the IAM service's (e.g., 108 in FIG. 1) private key. It should be appreciated, that signing the authentication token with the IAM service's (e.g., 108 in FIG. 1) private key will allow the backup agent to verify that the authentication token originated from the IAM service (e.g., 108 in FIG. 1) as described in further detail below.

In step 204, the backup agent attempts to decrypt the authentication token with its private key and, in step 206, a determination is made as to whether the decryption was successful. In one or more embodiments, successfully decrypting the authentication token confirms that the backup agent is the intended backup agent. Further, while the embodiment described herein utilizes a public-private key encryption method, it should be appreciated that any asymmetric cryptographic method may be utilized. Accordingly, if the result is YES then the method processes to step 208, if the result is no, then the method ends.

In step 208, the backup agent retrieves the IAM service's (e.g., 108 in FIG. 1) public keys from the IAM service (e.g., 108 in FIG. 1). In one or more embodiments, the public keys are downloaded over a well-known uniform resource identifier (URI). In one or more embodiments, a well-known URI is a standardized easily identifiable web address used to access specific resources or metadata such as public keys. It should be appreciated, that downloading the private keys over the well-known URI ensures secure and reliable access to the public keys.

In step 210, the backup agent uses the IAM service's (e.g., 108 FIG. 1) public keys to validate that the authentication token originated from the IAM service (e.g., 108 FIG. 1). In one or more embodiments, as discussed above, the authentication token has been signed with the IAM service's (e.g., 108 FIG. 1) private key. In one or more embodiments, the IAM service's (e.g., 108 FIG. 1) public keys are used to validate the IAM service's (e.g., 108 FIG. 1) private key signature (i.e., confirm that the IAM service (e.g., 108 in FIG. 1) has signed the authentication token with its private key). It should be appreciated, that the IAM service's (e.g., 108 FIG. 1) private key is unique to the IAM service (e.g., 108 FIG. 1), thus if the public key is valid, then the authentication token must have originated from the IAM service (e.g., 108 FIG. 1). In one or more embodiments, the backup agent may use the IAM service's (e.g., 108 FIG. 1) public keys to verify that the authentication token originated from the IAM service (e.g., 108 FIG. 1) by any means known in the art or discovered in the future.

In step 212, the backup agent determines whether the validation of the authentication token was successful (i.e., originated from the IAM service (e.g., 108 FIG. 1)). In one or more embodiments, if the IAM service's (e.g., 108 FIG. 1) public key verifies the private key signed on the authentication token, then the attention token is valid. In one or more embodiments, the backup agent may make the determination by any means known in the art or discovered in the future. Accordingly, if the result is YES then the method proceeds to step 214, if the determination is NO then the method may end.

In step 214, the backup agent proceeds with the intent specified in the authentication token. In one or more embodiments, the intent is related to an action of a set of actions for the backup agent to perform including but not limited to, performing backup operations on a computing device (e.g., data transfer, compression, etc.), performing restoration operations on data from the backup server (i.e., full system recovery, file/folder recovery, metadata recovery, etc.), performing maintenance operations on data from the backup server (e.g., deduplication, throttling, etc.), and performing security operations on data from the backup server (e.g., encryption, validation, tracking, authentication, etc.). It should be appreciated, that the preceding steps verify the identity of both the backup agent and the backup server, thereby enabling only the intended backup agent to be able to proceed with the intent signed on the authentication token. In one or more embodiments, the backup agent or backup server may notify a user via a graphical user interface (GUI) of the action that is to be performed by the backup agent. In one or more embodiments, the backup agent or backup server may notify the user via the GUI when the action has been completed by the backup agent.

In one or more embodiments, the method may end following step 214.

Turning to FIG. 3, FIG. 3 shows a flowchart of a method for generating an encrypted authentication token in accordance with one or more embodiments disclosed herein. The method may be performed by, for example, a backup server (e.g., one backup server of backup servers A-N of backup server group (e.g., 106 in FIG. 1)). Other components in the system may perform this method without departing from the scope of the disclosure.

In step 300, the backup server receives a registration from a backup agent (e.g., one backup agent of backup agents A to N of backup agent group (e.g., 100 in FIG. 1)). In one or more embodiments, the backup agent may send the registration to the backup server by any means known in the art or discovered in the future. In one or more embodiments, the registration is a message (e.g., an intent to establish a secure connection with the backup server) or data package, used to initiate the process of establishing a secure connection. In one or more embodiments, the data package may include but should not be limited to identity information, authentication information, capability specifications, configuration information, and all other relevant data about the backup agent.

In step 302, the backup server presents a certificate to the backup agent. In one or more embodiments, the backup server presents the certificate in response to receiving the registration from the backup agent. In one or more embodiments, the contents of the certificate are based on the contents of the registration. In one or more embodiments, the certificate is a digital document issued by a known and trusted certificate authority (CA) (i.e., a trusted entity that issues digital certificates to verify identities online) that verifies the identity of the backup server. In one or more embodiments, the certificate may include the backup server's public key, domain name, and the CA's signature. In one or more embodiments, the certificate may also include an egress IP address. In one or more embodiments, the certificate also includes a fully qualified domain name (FQDN). In one or more embodiments, a FQDN is a complete and precise domain name that specifies the exact location of a server resource within an internet hierarchy. In one or more embodiments, the FQDN specifies the domain name for which the certificate was issued.

In step 304, the backup agent determines whether the certificate is valid. In one or more embodiments, the backup agent validates the certificate by checking if originated from a known and trusted CA. In one or more embodiments, any known and trusted CA can be used that is known or established in the future. In one or more embodiments, the backup agent validates the certificate using a transport security (TLS) protocol. In one or more embodiments, TLS protocol refers to a cryptographic protocol (i.e., a set of rules or guidelines that devices (e.g., the backup server and backup agent) follow to communicate with each other and exchange information in a structured and predictable way) that ensure secure connection over a network (e.g., 102 in FIG. 1). In one or more embodiments, the TLS protocol defines the exact steps and checks needed to ensure the certificate is valid. In one or more embodiments, the certificate may be validated by matching the IP address or the FDQM of the certificate with a trusted domain name system (DNS) ensuring that the FQDN or IP address listed on the certificate matches the one retrieved from the trusted DNS. In one or more embodiments, the backup agent may determine whether the certificate is valid by any means known in the art or discovered in the future. Accordingly, if the result is YES then the method proceeds to step 306, if the result is no then the method ends.

In step 306, the backup server establishes a secure connection with the backup agent over the egress IP address present in the backup server's certificate. It should be appreciated, that establishing a secure connection over the egress IP will ensure that communication between the backup server and backup agent is private, reliable, and secure. In one or more embodiments, any form of egress IP may be used to establish the secure connection including but not limited to static egress IP, dynamic egress IP, private egress IP, etc.

In step 308, the backup server obtains an authentication token. In one or more embodiments, the authentication token is obtained from an identity access management (IAM) service (e.g., 108 in FIG. 1). In one or more embodiments, the authentication token is an OAuth token (i.e., a digital token used to grant and verify access to protection resources without sharing user credentials directly). In one or more embodiments, the authentication token is signed with a private key of the IAM service (e.g., 108 in FIG. 1). It should be appreciated, that the IAM service's (e.g., 108 in FIG. 1) private key can be verified with the IAM service's (e.g., 108 in FIG. 1) public key as discussed in FIG. 2.

In step 310, the backup server signs and encrypts the authentication token. In one or more embodiments, the backup server encrypts the authentication token with an intended backup agent's public key. In one or more embodiments, a public key is a cryptographic code used to encrypt data, unique to an entity (e.g., the intended backup agent). In one or more embodiments, data encrypted by the public key can only be decrypted using a private key (i.e., a confidential cryptographic code used to decrypt data, unique to and known only by an entity (e.g., the intended backup agent)) associated with the public key (e.g., the intended backup agent's private key). It should be appreciated, that once the authentication token has been encrypted with the intended backup agent's public key, it can only be decrypted using the intended backup agent's private key. It should be further appreciated, that the intended backup agent's private key is exclusive to the intended backup agent. Thus, only the intended backup agent will be able to utilize the authentication token. It should be appreciated, that as a result of the token being encrypted with the intended backup agent's private key, the authentication token is non-forwardable (i.e., the authentication token cannot be re-used by another backup agent once it has been issued by the backup server). It should be appreciated, that this will prevent unauthorized backup agents from utilizing the authentication token to perform unauthorized actions within the system (e.g., stealing data, deleting data, etc.). In one or more embodiments, the authentication token may be signed with an intent. In one or more embodiments, the intent is related to an action or a set of actions for the backup agent to perform as described above.

In step 312, the backup server sends the authentication token to the backup agent. In one or more embodiments, the backup server sends the authentication token to the backup agent over the egress IP. It should be appreciated, that that the backup server may send the authentic token to the backup agent by any means known in the art or discovered in the future.

In one or more embodiments, the method may end following step 312.

Embodiments of the disclosure may be implemented using computing devices. Turning to FIG. 4, FIG. 4 shows a diagram of a computing device (400) in accordance with one or more embodiments. The computing device (400) may include one or more computer processor(s) (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (408) (e.g., Bluetooth interface, infrared interface, network interface, optical interface, etc.), input devices (410), output devices (412), and numerous other elements (not shown) and functionalities. Each of these components is described below.

In one embodiment, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. The communication interface (408) may include an integrated circuit for connecting the computing device (400) to a network (e.g., 102 in FIG. 1) (e.g., a local area network (LAN), a wide area network (WAN) such as the Internet, mobile network, or any other type of network) and/or to another device, such as another computing device.

In one embodiment, the computing device (400) may include one or more output devices (412), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (410, 412) may be locally or remotely connected to the computer processor(s) (402), non-persistent storage (404), and persistent storage (406). Many diverse types of computing devices exist, and the aforementioned input and output device(s) (410, 412) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

In the detailed description of the embodiments above, numerous specific details are set forth in order to provide a more thorough understanding of one or more embodiments. However, it will be apparent to one of ordinary skill in the art that the one or more embodiments may be practiced without these specific details. In other instances, well-known features have not been described in detail to avoid unnecessarily complicating the description.

In the prior description of the figures, any component described with regard to a figure, in various embodiments, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device (not shown), a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for authenticating interactions between a backup agent and a backup server, the method comprising:
- receiving, by the backup agent, an authentication token from the backup server, wherein the authentication token is encrypted with a public key of an intended backup agent and signed with an intent such that only the intended backup agent can decrypt the authentication token;
- decrypting the authentication token, using a private key of the backup agent;
- making a first determination, based on the decrypting, that the backup agent is the intended backup agent, wherein successful decryption of the authentication token by the backup agent establishes that the backup agent is the intended backup agent;
- retrieving, based on the first determination, public keys related to the authentication token from an identity access management (IAM) service;
- validating the authentication token using the public keys related to the authentication token; and
- performing, in response to the validation and based on the intent, an action from an action set.

2. The method of claim 1, wherein the action from the action set comprises at least one from the following: performing a backup operation of a client device associated with the backup agent, performing a restoration operation of data from the backup server, and performing a maintenance operation of the client device.

3. The method of claim 1, wherein the authentication token is validated over a well-known uniform resource identifier.

4. The method of claim 1, wherein the backup server is one of a plurality of backup servers in a clustered appliance.

5. The method of claim 1, wherein, before receiving the authentication token from the backup server, the method further comprises:
- establishing, by the backup server, a secure connection with the backup agent;
- obtaining, by the backup server, in response to establishing the secure connection, the authentication token from the IAM service;
- signing and encrypting, by the backup server, the authentication token; and
- sending, by the backup server, the authentication token to the backup agent.

6. The method of claim 5, wherein establishing the secure connection comprises:
- receiving, by the backup server, a registration from the backup agent;
- presenting, by the backup server, in response to receiving the registration, a certificate to the backup agent; and
- making a second determination, by the backup agent, that the certificate is valid.

7. The method of claim 6, wherein the second determination is made based on determining that the certificate presented by the backup server was issued by a trusted certificate authority.

8. A non-transitory computer readable medium (CRM) comprising computer readable program code, which when executed by a computer processor, enables the computer to perform a method for authenticating interactions between a backup agent and a backup server, the method comprising:
- receiving, by the backup agent, an authentication token from the backup server, wherein the authentication token is encrypted with a public key of an intended backup agent and signed with an intent such that only the intended backup agent can decrypt the authentication token;
- decrypting the authentication token, using a private key of the backup agent;
- making a first determination, based on the decrypting, that the backup agent is the intended backup agent, wherein successful decryption of the authentication token by the backup agent establishes that the backup agent is the intended backup agent;
- retrieving, based on the first determination, public keys related to the authentication token from an identity access management (IAM) service;
- validating the authentication token using the public keys related to the authentication token; and
- performing, in response to the validation and based on the intent, an action from an action set.

9. The non-transitory CRM of claim 8, wherein the action from the action set comprises at least one from the following: performing a backup operation of a client device associated with the backup agent, performing a restoration operation of data from the backup server, and performing a maintenance operation of the client device.

10. The non-transitory CRM of claim 8, wherein the authentication token is validated over a well-known uniform resource identifier.

11. The non-transitory CRM of claim 8, wherein the backup server is one of a plurality of backup servers in a clustered appliance.

12. The non-transitory CRM of claim 8, wherein, before receiving the authentication token from the backup server, the method further comprises:

establishing, by the backup server, a secure connection with the backup agent;

obtaining, by the backup server, in response to establishing the secure connection, the authentication token from the IAM service;

signing and encrypting, by the backup server, the authentication token; and sending, by the backup server, the authentication token to the backup agent.

13. The non-transitory CRM of claim 12, wherein establishing the secure connection comprises:

receiving, by the backup server, a registration from the backup agent;

presenting, by the backup server, in response to receiving the registration, a certificate to the backup agent; and making a second determination, by the backup agent, that the certificate is valid.

14. The non-transitory CRM of claim 13, wherein the second determination is made based on determining that the certificate presented by the backup server was issued by a trusted certificate authority.

15. A system for authenticating interactions between a backup agent and a backup server, the system comprising:

persistent storage; and a computing device, comprising a processor and memory, programmed to:

receive, by the backup agent, an authentication token from the backup server, wherein the authentication token is encrypted with a public key of an intended backup agent and signed with an intent such that only the intended backup agent can decrypt the authentication token;

decrypt the authentication token, using a private key of the backup agent;

make a first determination, based on the decrypting, that the backup agent is the intended backup agent, wherein successful decryption of the authentication token by the backup agent establishes that the backup agent is the intended backup agent;

retrieve, based on the first determination, public keys related to the authentication token from an identity access management (IAM) service;

validate the authentication token using the public keys related to the authentication token; and perform, in response to the validation and based on the intent, an action from an action set.

16. The system of claim 15, wherein the action from the action set comprises at least one from the following: performing a backup operation of a client device associated with the backup agent, performing a restoration operation of data from the backup server, and performing a maintenance operation of the client device.

17. The system of claim 15, wherein the authentication token is validated over a well-known uniform resource identifier.

18. The system of claim 15, wherein the backup server is one of a plurality of backup servers in a clustered appliance.

19. The system of claim 15, wherein, before receiving the authentication token from the backup server, the computing device id further programmed to:

establish, by the backup server, a secure connection with the backup agent;

obtain, by the backup server, in response to establishing the secure connection, the authentication token from the IAM service;

sign and encrypting, by the backup server, the authentication token; and send, by the backup server, the authentication token to the backup agent.

20. The system of claim 19, wherein establishing the secure connection comprises:

receiving, by the backup server, a registration from the backup agent;

presenting, by the backup server, in response to receiving the registration, a certificate to the backup agent; and making a second determination, by the backup agent, that the certificate is valid.

* * * * *